(12) United States Patent
Harrison

(10) Patent No.: US 6,852,948 B1
(45) Date of Patent: Feb. 8, 2005

(54) HIGH CONTRAST SURFACE MARKING USING IRRADIATION OF ELECTROSTATICALLY APPLIED MARKING MATERIALS

(75) Inventor: Paul Wollcott Harrison, Los Angeles, CA (US)

(73) Assignee: TherMark, LLC, Pittsburgh, PA (US)

(*) Notice: Subject to any disclaimer, the term of this patent is extended or adjusted under 35 U.S.C. 154(b) by 0 days.

(21) Appl. No.: 09/880,391

(22) Filed: Jun. 13, 2001

Related U.S. Application Data

(60) Continuation-in-part of application No. 09/477,921, filed on Jan. 5, 2000, now Pat. No. 6,313,436, which is a division of application No. 08/925,031, filed on Sep. 8, 1997, now Pat. No. 6,075,223.

(51) Int. Cl.[7] .............................. B23K 26/00; B05D 1/04

(52) U.S. Cl. .................. 219/121.85; 347/224; 427/483; 427/555; 427/556

(58) Field of Search ..................... 219/121.85; 427/554, 427/555, 556, 475, 483; 347/224, 227; 428/426, 457

(56) References Cited

U.S. PATENT DOCUMENTS

| | | | |
|---|---|---|---|
| 3,558,052 A | | 1/1971 | Dunn |
| 3,691,991 A | * | 9/1972 | Luderer et al. |
| 3,930,062 A | | 12/1975 | Nedeljkovic |
| 3,945,318 A | | 3/1976 | Landsman ................. 430/200 |

(List continued on next page.)

FOREIGN PATENT DOCUMENTS

| | | | |
|---|---|---|---|
| DE | 201136 | 9/1981 | |
| DE | 215 776 A1 | 11/1984 | |
| DE | 35 39 047 A1 | 10/1986 | |
| EP | 0 419 377 A1 | 9/1990 | |
| EP | 0 531 584 A1 | 3/1991 | |
| EP | 0761377 A1 | 8/1996 | |
| EP | 0716 135 A1 | 12/1996 | |
| EP | 0 782 933 A1 | 12/1996 | |
| FR | WO/9632221 | 10/1996 | |
| FR | WO 99/29519 | 6/1999 | |
| FR | WO 99/42421 | 8/1999 | |
| GB | 2 169 282 A | 7/1986 | |
| GB | 2 227 570 A | 1/1990 | |
| JP | 62-223940 | 10/1987 | |
| JP | 63-216790 | 9/1988 | |
| JP | 1-194235 | 8/1989 | ................. 427/554 |
| JP | 5-92657 A | * 4/1993 | |
| JP | 5-138114 | 6/1993 | ................. 427/554 |
| JP | 6-106378 | 4/1994 | |
| JP | 9-108610 A | * 4/1997 | |
| WO | WO 95/13195 | 5/1995 | |

OTHER PUBLICATIONS

Authors: Karheinz Hahn, Claudia Buerhop, and Rudolf Weißmann Title: "Finring PbO-free glass enamels using the cw-CO2 laser" Date: Received Nov. 11, 1995.

International Searching Authority, International Search Report, Aug. 9, 1998, 9 pages total.

*Primary Examiner*—Geoffrey S. Evans
(74) *Attorney, Agent, or Firm*—Pepper Hamilton LLP

(57) ABSTRACT

A method of radiantly marking substrates including metals, plastics, ceramic materials, glazes, glass ceramics, and glasses of any desired form, which comprises electrostatically applying to the material to be marked a variable thickness layer of marking material containing energy absorbing components and/or enhancers, then irradiating said layer with a radiant energy source such as a laser or diode based energy source such that the radiation is directed onto said layer, optionally in accordance with the form of the marking to be applied, preferably using a laser or diode based energy source of a wavelength which is sufficiently absorbed by the marking material so as to create a bonding of the marking material to the surface of the workpiece at the irradiated areas.

39 Claims, 9 Drawing Sheets

U.S. PATENT DOCUMENTS

| | | |
|---|---|---|
| 3,962,513 A | 6/1976 | Eames .................. 430/200 |
| 4,099,486 A | 7/1978 | Bialorucki et al. |
| 4,110,486 A | 8/1978 | Lacchia |
| 4,306,012 A | 12/1981 | Scheve |
| 4,327,283 A | 4/1982 | Heyman et al. ............ 235/487 |
| 4,515,867 A | 5/1985 | Bleacher et al. ............ 428/204 |
| 4,541,340 A | 9/1985 | Peart et al. ................. 101/470 |
| 4,651,313 A | 3/1987 | Guez ........................... 369/14 |
| 4,769,310 A | 9/1988 | Gugger et al. .............. 430/346 |
| 4,847,181 A | 7/1989 | Shimokawa ................ 430/297 |
| 4,854,957 A | 8/1989 | Borrelli et al. ............ 65/30.11 |
| 4,856,670 A | 8/1989 | Hang |
| 4,861,620 A | 8/1989 | Azuma et al. ............. 427/53.1 |
| 4,912,298 A | 3/1990 | Daniels et al. ......... 219/121.69 |
| 5,030,551 A | 7/1991 | Herren et al. ............... 430/495 |
| 5,035,983 A | 7/1991 | Kiyonori et al. .......... 346/135.1 |
| 5,061,341 A | 10/1991 | Kildal et al. ................ 156/632 |
| 5,075,195 A | 12/1991 | Babler et al. ............... 430/200 |
| 5,175,425 A | 12/1992 | Spratte et al. .............. 347/224 |
| 5,359,176 A | 10/1994 | Balliet, Jr. et al. ...... 219/121.67 |
| 5,397,686 A | 3/1995 | Dominick et al. .......... 430/346 |
| 5,409,742 A | 4/1995 | Arfsten et al. ............... 427/555 |
| 5,422,146 A | 6/1995 | Adams |
| 5,427,825 A | 6/1995 | Murnick ..................... 427/555 |
| 5,523,125 A | 6/1996 | Kennedy et al. ............ 427/555 |
| 5,543,269 A | 8/1996 | Chatterjee et al. .......... 430/346 |
| 5,554,335 A | 9/1996 | Fields et al. ................. 264/400 |
| 5,609,778 A | 3/1997 | Pulaski et al. ......... 219/121.69 |
| 5,637,244 A | 6/1997 | Erokhin ................. 219/121.69 |
| 5,698,269 A | 12/1997 | Carlblom et al. |
| 5,719,372 A | 2/1998 | Togari et al. .......... 219/121.61 |
| 5,734,412 A | 3/1998 | Hasebe et al. .............. 347/247 |
| 5,740,941 A | 4/1998 | Lemelson ................... 220/454 |
| 5,760,367 A | 6/1998 | Rosenwasser et al. . 219/121.69 |
| 5,761,111 A | 6/1998 | Glezer ........................ 365/106 |
| 5,767,483 A | 6/1998 | Cameron et al. ...... 219/121.85 |
| 5,783,507 A | 7/1998 | Sakoske ....................... 501/17 |
| 5,801,356 A | 9/1998 | Richman ............... 219/121.69 |
| 5,804,342 A | 9/1998 | Paz-Pujalt et al. ............ 430/19 |
| 5,830,274 A | 11/1998 | Jones et al. |
| 5,840,449 A * | 11/1998 | Zambounis et al. |
| 6,063,194 A | 5/2000 | Poliniak et al. |

* cited by examiner

| Substrate Materials | Marking Materials | Beam Speed | Power (watts) | Freq (Khz/Cw) |
|---|---|---|---|---|
| Aluminum | Mixed Metal Oxide | 200mm/sec | 5 watts | CW |
| Aluminum | Glass Frit | 250mm/sec | 5 watts | CW |
| Brass | Mixed Metal Oxide | 200mm/sec | 5 watts | CW |
| Ceramic | Glass Frit | 200mm/sec | 5 watts | CW |
| China | Glass Frit | 200mm/sec | 5 watts | CW |
| Copper | Mixed Metal Oxide | 100mm/sec | 5 watts | 20 KHz |
| Auto Safety Glass | Glass Frit | 200mm/sec | 5 watts | CW |
| CRT Display Glass | Glass Frit | 200mm/sec | 5 watts | CW |
| Flat Panel Display Glass | Glass Frit | 200mm/sec | 5 watts | CW |
| Microscope Slide Glass | Glass Frit | 200mm/sec | 5 watts | CW |
| Nickel | Mixed Metal Oxide | 200mm/sec | 5 watts | CW |
| Nylon™ | Mixed Metal Oxides | 250mm/sec | 5 watts | CW |
| Porcelain | Glass Frit | 200mm/sec | 5 watts | CW |
| PVC | Mixed Organic Pigments | 200mm/sec | 5 watts | CW |
| Stainless Steel | Mixed Metal Oxide | 200mm/sec | 5 watts | CW |
| Stainless Steel | Glass Frit | 300mm/sec | 5 watts | CW |
| Teflon™ | Mixed Metal Oxides | 200mm/sec | 5 watts | CW |
| Tin | Mixed Metal Oxide | 200mm/sec | 5 watts | CW |
| Titanium | Mixed Metal Oxide | 200mm/sec | 5 watts | CW |

FIG. 8

HIGH CONTRAST SURFACE MARKING USING IRRADIATION OF ELECTROSTATICALLY APPLIED MARKING MATERIALS

CROSS REFERENCES TO RELATED PATENTS

This application is a continuation-in-part of U.S. application Ser. No. 09/477,921, filed Jan. 5, 2000 and now issued as U.S. Pat. No. 6,313,436, which is a divisional application of U.S. application Ser. No. 08/925,031, filed Sep. 8, 1997 and issued as U.S. Pat. No. 6,075,223 on Jun. 13, 2000. International application PCT/US98/18720, filed on Sep. 8, 1998 and published as WO 99/16625 on Apr. 8, 1999, claimed priority from U.S. Ser. No. 08/925,031.

FIELD OF INVENTION

The present invention relates to a method of producing permanent, enhanced contrast and/or color markings formed as a new marking layer on top of substrates including glass, ceramic, porcelain, metal, and plastic. A laser beam or other suitable radiant energy source irradiates a marking medium having a glass frit containing an energy absorbing enhancer, or alternatively the marking medium can be a mixed metal oxide or a mixed organic pigment. This invention further relates to a method of producing permanent enhanced contrast and/or color markings formed as a new marking layer on top of both electrically conductive and non-conductive substrate materials by electrostatically coating said substrate materials and irradiating said coating with a laser beam in accordance with the form of a mark or decoration to be produced. In particular, this invention pertains to the application of laser marking materials in a controlled pattern of finely separated, charged coating particles projected toward an electrically-isolated and/or oppositely-charged substrate material.

BACKGROUND OF THE INVENTION

The marking of ceramic materials, glazes and glasses can be effected by conventional marking and decoration methods such as etching, cutting, engraving, grinding or by applying a glass or glaze colorant. In these methods, the surface of the marked material is altered with the consequence that the material may suffer damage, especially if marking is effected by etching, engraving, or cutting. The application of a glass or glaze colorant necessitates, in addition, a second firing step. The markings so produced are not always satisfactory in all respects.

It is also known to mark glass by means of a laser beam, whereas the known methods are based on melting or removing substrate material such that the surface of the marked material is also altered.

German Offenlegungsschrift 3 539 047 postulates a method of decorating, marking, and engraving enameled objects using laser beams by incorporating into the enamel coating opacifying agents which the laser beam causes to decompose optically and locally; for example, oxides of titanium, tin, cerium, and antimony. A drawback of this method is that, for example, transparent enameled objects cannot be marked because the opacifying agent incorporated in the enamel coating does not change optically at the non-irradiated areas and, therefore, strongly influences the overall appearance of the object. Furthermore, the opacifying agent employed may adversely affect the mechanical properties of the enamel.

Industry has sought to surface mark glass, ceramic, porcelain, metal, plastics, and the like with four physical attributes. These four attributes are high-resolution, high-contrast, permanence, and speed.

Well known efforts to date have only produced two or three of these attributes. For example, kiln marking ceramics using glass frit material at kiln temperatures ranging from 100° to 1000° C. results in high-resolution, high-contrast, permanent indicia on ceramics, glass, and metals. These known processes require heating the entire substrate along with the glass frit or metal oxide marking material in a kiln. The problem with these processes is the time factor and energy consumption are not commercially efficient to create the indicia. Time factors ranging from minutes to hours are common. Energy consumption of a kiln is generally measured in kilowatts per ton and/or BTUs per pound. Furthermore, these processes do not lend themselves to portability.

Another known marking method is peening on metal. This method cannot be used on glass, ceramic, or other brittle materials because of surface damage and/or breakage. Where used, this method produces a high-resolution, permanent, fast surface indicia. However, high contrast marks are not produced.

Other known marking methods are ink printing methods. One state of the art transfer printing method is taught by WO 95/13195 (May 1995) to Meneghine et al, assigned to Markem Corporation. These methods use a laser-transferable ink on a plastic carrier. The ink is mixed in a transfer medium solution in order to enhance the conversion of laser (IR) energy to heat. These methods produce a high-resolution, high-contrast, and relatively fast method. There is a UV cure step which is time consuming. The problem with this and all ink methods is a lack of permanence. Acids and other solvents remove ink from a hard surface. This method teaches curing the ink onto the substrate surface. The present invention teaches bonding a marking medium to form a new marking layer atop the substrate surface rather than transferring an ink to the substrate and then curing the ink.

Another well known marking method teaches the use of ink jet printers. In order to improve application performance, appearance and permanence, environmentally hazardous solvents are mixed with the ink. Even with these hazardous solvents however, significant improvement has not been achieved.

U.S. Pat. No. 4,541,340 (1985) to Peart et al. discloses a printing process for marking fabrics or plastics in a permanent image. Sublimable dyes are used such as nitroso dyes. A diffusion of the dyestuff into the substrate is caused by a pressurized air step on a transfer label. Only application to fabrics and plastics is taught. The chemistry is different from the present invention. However, the result of a permanent high contrast mark is claimed.

Another related group of marking methods is laser combined with glass frit or metal oxide marking media. U.S. Pat. No. 4,769,310 (1988) to Gugger et al. teaches first creating a glaze in a kiln process. The glaze has a radiation sensitive additive in amounts ranging from 0.01 to 30% by weight. This glaze is then irradiated by a beam of Nd:YAG pulsed laser having light pulses of six to eight nanoseconds at a wavelength of 0.532 $\mu$m and a pulse content of 250 millijoules. The problem with this method is the burden of creating a time consuming glaze surface before applying the high-speed laser beam.

U.S. Pat. No. 5,030,551 (1991) to Herren et al. teaches a laser-based method to mark ceramic materials, glazes, glass ceramics, and glasses by first applying to a workpiece a 100 to 10,000 Angstrom thick transparent layer of titanium dioxide. Second, the workpiece is fired in an oven at 620° C. for one minute and then slowly cooled in the closed oven. Third, the layer is irradiated with a pulsed laser in accordance with the form of the marking to be applied. The laser light must have a wavelength which is sufficiently absorbed by the oxide layer so that a discoloration of the oxide layer is produced at the irradiated areas. The problem with this method is the time and energy-consuming step of firing and cooling the workpiece.

The method of the present invention makes it possible to produce a direct and rapid marking that is indelible and which is, therefore, abrasion and scratch-proof. The markings obtained are also corrosion-proof, solvent-resistant, dimensionally stable, free from deformation, fast to light, heat, and weathering, easily legible, and have good contrast and very good edge definition. In addition, there is virtually no impairment of the mechanical, physical, and chemical properties of the marked material, e.g. mechanical strength and chemical resistance.

There has now been found a flexible method which makes it possible to mark metals, plastics, ceramic materials, glazes, glass ceramics and glasses without damaging the surface thereof and without specific requirements being made of the substrate, which method comprises the use of a glass frit based or mixed organic materials or mixed metal oxide layer for the laser marking.

Accordingly, the present invention relates to a method of radiantly marking both conductive and dielectric materials including metals, plastics, ceramic materials, glazes, glass ceramics and glasses of any desired form which comprises steps of applying to the substrate material a marking material which, depending upon its principal components, may or may not contain at least one energy absorbing enhancer, then irradiating said marking material layer with a laser or diode based energy source such that the radiation is directed onto said layer in accordance with the form of the marking to be applied, and using laser or diode based energy of a wavelength which is sufficiently absorbed by the marking material so that a bonding occurs on the substrate, thereby forming a marking layer atop the substrate.

A preferred embodiment of the present invention employs electrostatic methods of applying marking materials to the substrates. The principles behind electrostatics have been applied in the development of electrophoresis, powder coating sprayers, xerography and ink jet printers. Electrostatic coating technology has been available for many years and is widely used for the coating of household appliances such as ranges, refrigerators, washing machines and dryers. There are some subtle aspects to this science such as fine atomizing of liquid droplets, fine de-agglomerating and diffusion of powders, eliminating or shielding unintended target areas, creation of an optimal electrical charge on the part surface as well as optimizing part geometry and orientation. Characteristics of electrostatic coating processes include low energy expenditure, absence of pollution or other undesirable effluents, and high material utilization efficiencies. Its applications reduce waste and improve manufacturing efficiency and product quality. There are no apparent adverse secondary effects from application of electrostatics.

Behind the operation of all electrostatic coating equipment is the fundamental principle that oppositely charged bodies attract one another. Therefore, charged marking material particles would be attracted towards a grounded or oppositely-charged article. In the electrostatic coating process, the target substrate is grounded so that it is electrically neutral. The coating system creates, electrically charges, and disperses solid particles or liquid droplets of the marking material toward the target substrate by a variety of methods well known to one skilled in the art. The charged marking material particles are attracted to the grounded, neutral substrate and are deposited on it. Since the charged particles are all charged alike they repel from each other during the flight to the target and while "landing". These marking material particles avoid each other and seek areas on the target surface that are best grounded (i.e. uncoated areas). This is one of the simplest and most elegant aspects of the electrostatic coating process: deposition is uniform because the least coated areas get coated by the "newest" particles. The use of electrostatic deposition technology means that very good reproducibility and precision of deposition can be obtained—relative standard deviations (RSDs) of 1–2 percent of coating thickness can be achieved. This is a significant improvement and tremendous advantage over conventional coating methods.

Since the article being coated is the collecting electrode in the electrostatic coating process, it should have sufficient electrical conductivity, either through its bulk or across its surface, to carry away the electrical charge arriving on the surface with the accumulating marking material particles. For this reason, the electrostatic coating process is most often used to coat objects which are natural conductors of electricity (e.g. metals).

Typically, such conductive articles are held at a grounded potential by merely being supported from a grounded conveyor with a metal hook. By induction from the charging electrode, the conductive article assumes an electrical charge, which is opposite to that of the charged marking material particles. Accordingly, the electrically conductive article attracts the charged marking material particles.

Notwithstanding the above, electrostatic coating practices are also used to coat articles made from non-conductive or dielectric materials (e.g. plastics, glass, ceramics, wood, etc.), hereinafter collectively referred to as "dielectric materials". When used for these purposes, it becomes necessary to make the dielectric material either a permanent or temporary electrical conductor. A number of techniques have been perfected to accomplish this objective and these methods are well known to one skilled in the art.

For example, molded rubber steering wheels are not natural conductors of electricity; however, they can be made electrically conductive by heating them to temperatures of at least about 212° F. (1000° C.). While this practice works well for electrostatically coating some dielectric materials, it has a number of problems associated therewith. For example, this practice cannot be used to induce a charge on those dielectric materials which do not become electrically conductive when heated (e.g., wood). Moreover, this practice also cannot be used to induce a charge on those dielectric materials, which begin to deform or degrade at or below the temperature needed to make them electrically conductive.

Another method of electrostatically spraying a dielectric material consists of coating the material with an electrically conductive primer. This practice is used in the coating of toilet seats. Specifically, toilet seats are normally made from a phenolic resin/wood-flour mixture. This material is non-conductive and does not become conductive upon heating. Accordingly, to make it possible to electrostatically coat these items, the seats are first sprayed with an electrically conductive, film forming primer. When dried, this coating creates an electrically conductive film on the surface of the seat. After being coated with this primer, the seats are supported from a grounded conveyor with metal hooks. Thereafter, the marking materials could be electrostatically applied.

Electrostatic coating methods are disclosed in many patents.

U.S. Pat. No. 2,622,833 discloses a process and apparatus for electrostatically coating the exterior surfaces of hollow articles made from a dielectric or non-conductive material without the use of backing electrodes, which conform to the shape of the article. In that patent, the articles being coated are mounted onto spindles, which are connected to a conveyor system. The conveyor and the spindles are electrically conductive. Moreover, they are both connected through a conductor to either a ground or a power supply.

In U.S. Pat. No. 2,622,833, a conductive probe, which has an ionizing point or points, is electrically connected to the spindles. This probe is positioned so that it passes, through the article's opening, into the cavity of the article being coated. The spindles then carry these articles between oppositely disposed, spaced negatively-charged electrodes. As the articles pass the electrodes, an electrostatic field is created between the negatively-charged electrodes and the exterior surface of the article. One or more spray guns are directed so as to introduce an atomized coating composition in a direction generally parallel to the path of travel of the articles into the space between the articles and the electrodes. As the marking material particles enter into the ionizing zone, they accept a negative charge and are thus drawn to the grounded or positively-charged article.

U.S. Pat. No. 4,099,486 also discloses a process and apparatus for electrostatically coating glass bottles by using a particular chuck for supporting the bottles which is designed to prevent build-up of coatings thereon. That patent induces a charge onto the glass bottles by heating them to a temperature ranging between 150° F. (66° C.) to 450° F. (232° C.). According to U.S. Pat. No. 4,099,486, the supporting chuck is made from a non-conductive plastic. This chuck fits over a grounding plug, which is designed to ground the bottle by being in physical contact therewith. For example, one embodiment of a ground plug described in that patent is in the form of a flat-headed probe upon which rests the neck of the bottle. Another embodiment of a ground plug described in that patent is in the form of a flat-ended rod which extends into the bottle's opening, and through the bottle's entire length, until the distal end of the rod contacts the inside surface of the bottle's base. Yet another embodiment of a ground plug described in that patent is in the form of a flat-ended rod whose outside dimension is parallel to the inside dimension of the bottle's opening. With this latter configuration, when the ground plug is inserted into the bottle's opening, the outside walls of the plug contact the inside walls of the bottle's neck. Additional patents disclosing electrostatic coating methods and apparatus include:

U.S. Pat. No. 6,063,194 (Dry Powder Deposition Apparatus)

U.S. Pat. No. 5,830,274 (Electrostatic Deposition of Charged Coating Particles onto a Dielectric Substrate)

U.S. Pat. No. 5,698,269 (Electrostatic Deposition of Charged Coating Particles onto a Dielectric Substrate)

U.S. Pat. No. 4,099,486 (Electrostatically Coating Hollow Glass Articles)

U.S. Pat. No. 4,110,486 (Electrostatic Powder Coating Method)

U.S. Pat. No. 3,930,062 (Composition and Method for Electrostatic Deposition of Dry Porcelain Enamel Frit)

U.S. Pat. No. 3,558,052 (Method and Apparatus for Spraying Electrostatic Dry Powder).

Fully integrated electrostatic coating systems are commercially available for efficient coating of small parts in laboratory and batch-production operations from companies such as Trutec Industries, Powder Spray Technologies, Double D Equipment Company and Wagner International. To coat small parts, use of an electrostatic or hot-dip fluidized bed system can provide efficient coating quality. An electrostatic fluidized bed can be used for either electrostatic deposition or for hot-dip coating of small parts, and can operate with just a few ounces of marking materials.

SUMMARY OF THE INVENTION

The main aspect of the present invention is to provide a method to quickly, with high-resolution, high-contrast, and permanence, mark the surface of a workpiece.

Another aspect of the present invention is to provide a method to irradiate a marking material which may or may not contain at least one energy absorbing enhancer, wherein the marking material is selected from the group consisting of glass frits, glass frits with ceramic colorants, and glass frits with porcelain enamels, where the workpiece is a conductive or dielectric material such as glass, ceramic, porcelain, certain metals, and certain plastics. (Clear glass and glass frits do not absorb energy in the 1 micron range of the Nd:YAG or diode lasers, but do absorb energy in the 10 micron range, so these materials may not require additional energy absorbing enhancers.)

Another aspect of the present invention is to provide a method to irradiate a marking material containing metal compounds including mixed metal oxides where the workpiece is metal, glass, ceramic, porcelain and certain plastics.

Another aspect of the present invention is to provide a method to irradiate a marking material containing mixed organic pigments where the workpiece is plastic, glass, ceramic, porcelain and certain metals.

Another main aspect of the invention related to all of the above aspects is to provide various electrostatic methods of applying the marking materials to the substrate to be marked.

Other aspects of this invention will appear from the following description and appended claims, reference being made to the accompanying drawing forming a part of this specification wherein like referenced characters designate corresponding parts in the drawing.

Thus, in accordance with the present invention, a series of thermally activated, chemically based marking methods are provided, comprising steps of:

electrostatically applying a layer of an energy absorbing marking material to a conductive or dielectric substrate to be marked; and irradiating the layer of marking material with a radiant energy beam having a wavelength selected to excite the energy absorbing material in accordance with the form of a marking to be applied, thereby forming a marking layer atop the substrate. The objective is generally to provide a bonded and permanent marking atop the substrate which is visible in contrast with the substrate.

When electrostatically applying the marking material to dielectric substrates, a conductive layer of material is normally first applied to the substrate.

The irradiation process can be improved by providing a laminar air flow across the substrate during the irradiating step which maintains a consistent environment by carrying away any gasses created during the irradiating step of the inventive process, and preferably is started at an ambient temperature of about 70 deg. F.

The marking material can comprise a variety of substances which can be tailored to the substrate, but must contain at least one component which will absorb sufficient radiant energy to cause the marking material to fuse or sinter and create a permanently bonded marking upon the substrate. In some cases an energy absorbing enhancer such as carbon black can be included in the marking material. The marking materials can include various metal compounds including oxides, mixed oxides, sulfides, sulfates, carbonates, carbides, nitrides and silicides. Colorants can be included, as described below. The marking material can also include various types of glass frit material, alone or in combination with various metal compounds.

The substrates can comprise a variety of conductive and dielectric materials selected from suitable metals, glasses, ceramics and plastics.

Prior to the present invention, no quick and permanent method existed for marking certain substrate materials with enhanced contrast and/or color which would also permit the rapid change of content and/or information in the mark without structural damage to the substrate material. In theory, an optical power source, properly focused, could create the same temperatures obtained by ovens and/or kilns used in conventional "firing" processes involving marking materials. The speed of computer controls for the optical power source, the beam steering mechanism and the mark content make it possible for individual enhanced contrast and/or color marks to be bonded to the various substrate materials in extremely short time periods without structural damage in a way not attainable by any other marking or decorating process. The wide variety of marking materials make it possible to produce images with varying optical properties including, but not limited to, contrast, color, reflectance, diffraction; and varying physical properties including, but not limited to, thickness, durability, stability, structural shape and electrical conductivity.

The present inventive process of permanently marking materials will be especially useful in marking glass, ceramic, porcelain, and other brittle materials whose surface structure cannot withstand the thermal shock of other commonly used high-power pulsed laser marking methods. In the present invention, the resulting images on all substrate materials have enhanced contrast and/or color which makes the mark more easily viewed and imaged by the human eye and/or machine vision equipment and is highly resistant to chemical and mechanical wear. This feature is a great advance in barcode and 2D symbology marking, since the prior art high-power pulsed laser-only marking systems cannot always create sufficient contrast and/or color markings.

This invention relates to the permanent bonding of enhanced contrast and/or colored materials to the surfaces of various conductive or dielectric materials including glass, ceramic, porcelain, metal, and plastic substrates using radiant energy produced by, but not limited to, optical power sources such as lasers, laser diodes, direct diodes and diode-pumped lasers. The sun's radiant energy, properly filtered and focused, could make an acceptable radiant energy source. The wavelength ($\lambda$) and output power (watts) of the optical power source are determined by the combination of the composition of the substrate material and the natural or enhanced energy absorbing characteristics of specific marking material to be applied. The marking materials are formulated to react with various substrate materials at certain temperatures. The radiant energy source can produce the required temperatures in small localized areas within microseconds and create an environment where the desired chemical and mechanical reactions will occur. Virtually any computer-generated mark can be produced on a substrate by moving the beam emanating from the radiant energy source on the marking material on the surface of the workpiece using conventional beam steering mechanisms and/or X-Y plotter mechanisms and/or by moving the workpiece relative to a stationary beam.

The marking material is electrostatically applied to the surface of the workpiece. The beam emanating from the radiant energy source impinges upon the marking material, which absorbs the radiant energy and elevates it to the required temperature. In absorbing the radiant energy, at least a portion of the marking material is excited, i.e. has its atoms or molecules raised to an excited state. [See Webster's Encyclopedic Unabridged Dictionary of the English Language (Portland House, New York, 1989), page 497.] Typically, a temperature of 200° to 1500° F. is reached in approximately one to two microseconds. Precise temperatures are controlled by the output power of the radiant energy source and the physical position of the marking material relative to the focal plane of the radiant energy beam and the speed with which the beam is moving. Once the required temperature is achieved, the marking material and substrate will permanently bond together to form a new marking layer atop the substrate. The interaction of the radiant energy and the marking material is believed to result in an inert coating mechanically and chemically bonded to the substrate material. The marking layer is believed to form covalent bonds with the substrate material, and it is believed this chemical bond exceeds the strength of the mechanical bond. Marking materials can be formulated to absorb specific amounts of a specified wavelength of the radiant energy.

$CO_2$ lasers are capable of permanently marking glass materials by thermally shocking the surface and causing fractured facets. These fractures are detrimental to the structural integrity of the glass and will continue to propagate, causing chips to fall out of the mark. Furthermore, the imaged mark has no enhanced contrast and is difficult to view or image. Certain organic materials (wood, plastic, etc.) are easily marked using $CO_2$ lasers, but the resulting imaged mark can only have limited color and/or contrast based on the material composition and the effect of the laser energy (it will cause burning of the surface). There are a number of specially formulated plastic materials that will change color when exposed to specific laser energy and produce an enhanced contrast mark.

Nd:YAG lasers are generally capable of permanently marking a variety of metals and some organic materials. However, the same limited variation of color and contrast applies. Some steels and other hard metals can be burned with sufficient laser power to produce a dark mark against the natural surface color. However, the heat created by this method causes the area surrounding the mark to darken resulting in significantly decreased contrast. Additionally, very few color variations are possible. Most direct diodes cannot produce sufficient beam quality or power to achieve the same effects as the Nd:YAG lasers.

The principal advantages of the inventive process are:
no structural damage to the substrate material surface;
no post processing required to stabilize the finished mark;
wide variety of colors, contrasts and physical properties;
high resolution for the imaged mark;

resistant to chemical and mechanical wear;

marking speeds in seconds, not minutes or hours;

image content can be changed at computer speeds;

individual marks can be fully automated; and permanent markings will withstand flexing, expansion and contraction of substrate.

Features of the inventive process believed to be significant improvements are:

1) The use of laser or diode based radiation to rapidly elevate the temperature of the marking material atop the substrate to form a new marking layer atop the substrate.
2) a single laser beam pass is all that is required.
3) Selecting marking materials specially formulated to react with specific substrate materials using laser or diode based radiation as the catalyst.
4) Speed with which the mark can be produced.
5) Speed with which the content of the mark can be changed.
6) Method of delivery of marking material to the substrate surface including various types of electrostatic deposition.
7) Marks can be applied to glass and other brittle surfaces without fracturing.
8) Enhanced contrast and/or color of mark.
9) Two-, three-, or four-color images can be marked with near photo quality.
10) Elimination of any firing step of entire workpiece.
11) Ability to first ablate (if desired) and then mark selected substrates to create 3D high-contrast markings with a simple two-step process.
12) Using relatively low-cost, low-contaminating marking materials (glass frits, mixed metal oxides, or mixed organic pigments) instead of silver oxides or other high-cost highly-toxic materials.
13) Higher resolution of imaged mark (>1000 dpi).

A significant feature added by the present invention is the use of various suitable electrostatic methods of applying the marking materials to the substrates be radiantly marked using radiant energy. As described above in general and below in detail as to the present invention, many electrostatic application methods are known to those in the art, and suitable disclosures are found in many U.S. patents. In most cases where marking materials are to be applied to conductive materials such as metals, the marking materials can be directly applied in liquid, aerosol or finely-divided solid form to the substrate or other surface to be marked by suitable electrostatic methods. When dielectric materials such as glasses, ceramics, plastics and the like are to be marked, a conductive coating or layer should normally be applied to the surface before the marking materials themselves are electrostatically applied, as is well known in the art.

A more complete appreciation of the present invention, and many of the attendant aspects and advantages thereof, will be readily ascertained as the invention becomes better understood by reference to the following Detailed Description when considered with the accompanying Figures briefly described below.

BRIEF DESCRIPTION OF FIGURES AND EXAMPLES

The following figures are incorporated by reference from the parent application, U.S. Ser. No. 08/925,031, filed Sep. 8, 1997 and issued as U.S. Pat. No. 6,075,223 on Jun. 13, 2000, with FIG. 1 of that application omitted.

In all the below listed figures, the resulting marks were produced on commercially available Nd:YAG laser markers as manufactured, for example, by GSILumonics Corporation, A B Lasers, Inc., Control Laser, Inc., and/or Rofin Sinar, Inc. with power capability and optical configurations capable of providing the referenced marker parameters. In all examples the laser marker utilized produced a spot size of 100 to 125 microns, and the surface of the workpiece was placed 2 mm to 3 mm below the focal plane of the laser beam. In FIG. 1 through FIG. 7 the marking material was applied with resulting thicknesses between 75 and 125 microns on the workpiece surface.

FIG. 1 is a photograph of a stainless steel workpiece having the uppermost mark produced using Cerdec 29-1777 Amber Stain mixed metal oxide mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second. The lower mark was produced using the same laser settings without the inventive process resulting in only an ablative laser process and a mark of varying contrast that is totally dependent upon the viewing angle.

FIG. 2 is a photograph of a polished stainless steel workpiece having the mark produced using Cerdec 29-1777 mixed metal oxide mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 3 is a photograph of an aluminum workpiece having the mark produced using 10 parts Cerdec 29-1060 mixed metal oxide combined with 1 part Cerdec 29-1777 mixed metal oxide and then mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 4 is a photograph of an alumina ceramic workpiece having the mark produced using Cerdec 24-2702 glass frit containing energy absorbing enhancers mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 5 is a photograph of a quartz-glass light bulb having the mark produced using Cerdec 24-2702 glass frit containing energy absorbing enhancers mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 6 is a photograph of a soda-lime glass microscope slide having the mark produced using Cerdec 24-2702 glass frit containing energy absorbing enhancers mixed at a 1/1 ratio by weight with mineral oil as the marking material with the inventive process to form a 2D symbology mark with alpha-numeric characters and exhibiting high contrast from all viewing angles with no detectable damage to the workpiece surface. The mark was produced using 5 watts of CW energy at a beam speed of 200 mm/second.

FIG. 7 is a photograph of a piece of borosilicate flat panel display glass having the mark produced using Cerdec 24-2702 glass frit containing energy absorbing enhancers mixed at a 1/1 ratio by weight with mineral oil as the marking material with the inventive process to form a 2D symbology mark with alpha-numeric characters and exhibiting high contrast from all viewing angles with no detectable damage to the workpiece surface. The mark was produced using 5 watts of CW energy at a beam speed of 200 mm/second.

FIG. 8 is a chart showing the laser marker parameters used to produce marks on a variety of substrate materials.

Figure 6:
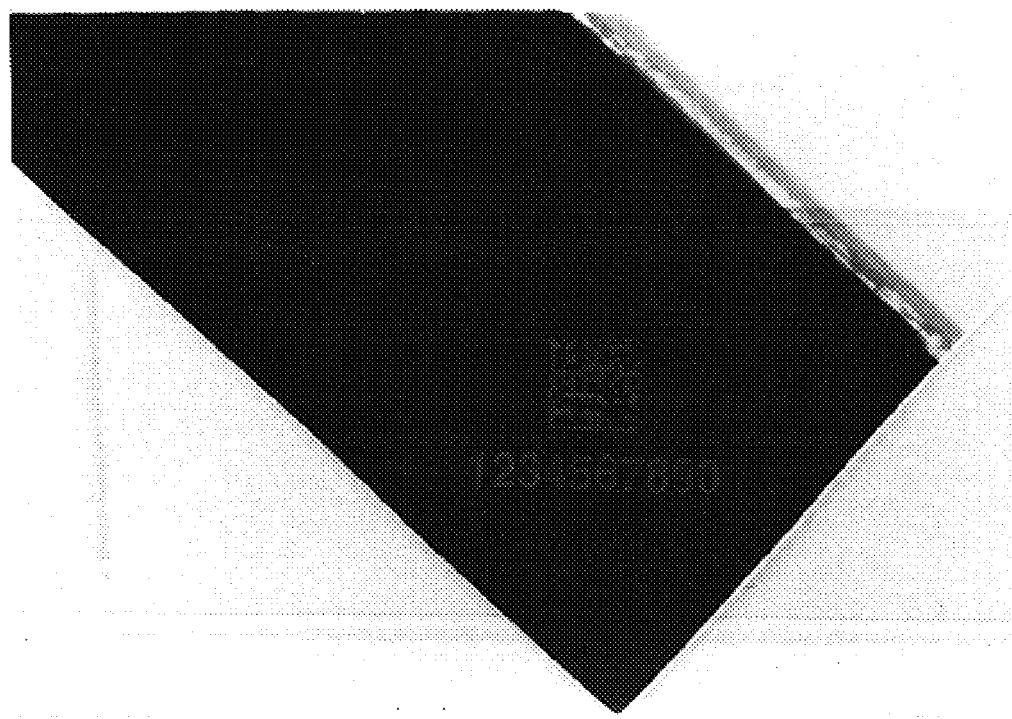
Figure 7:
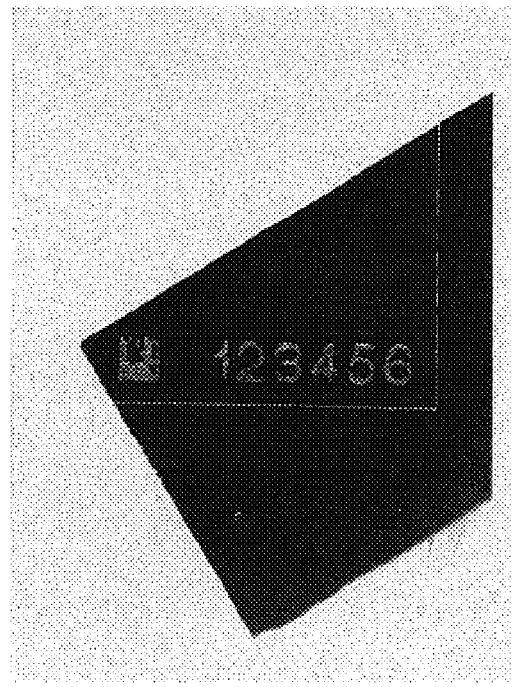

FIGS. 10a through 10d show a 2D profile of a small portion of the mark produced with the inventive process as shown in FIG. 6 with an average thickness of approximately 3 microns and a maximum thickness of approximately 14 microns. Similar results are obtained when using the inventive process on other substrate materials.

HYPOTHETICAL EXAMPLE A

Figure 1:
Figure 2:
Figure 3:
Figure 4:
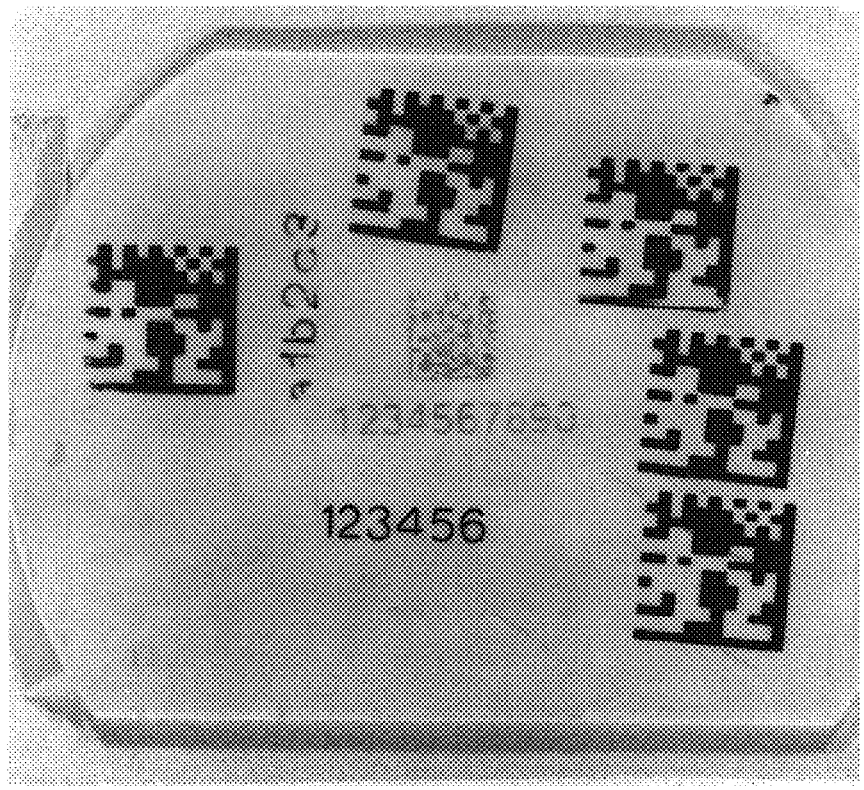

The marking materials and substrate described and illustrated in FIG. 1 above are employed, applying the marking materials electrostatically as dry particles. Application of the same laser beam producers markings which have more even edges, a smoother surface and more uniform thickness.

HYPOTHETICAL EXAMPLE B

The marking materials and substrate described and illustrated in FIG. 1 above are employed, applying the marking materials electrostatically as liquid droplets. Application of the same laser beam producers markings which have more even edges, a smoother surface and more uniform thickness.

HYPOTHETICAL EXAMPLE C

Figure 5:
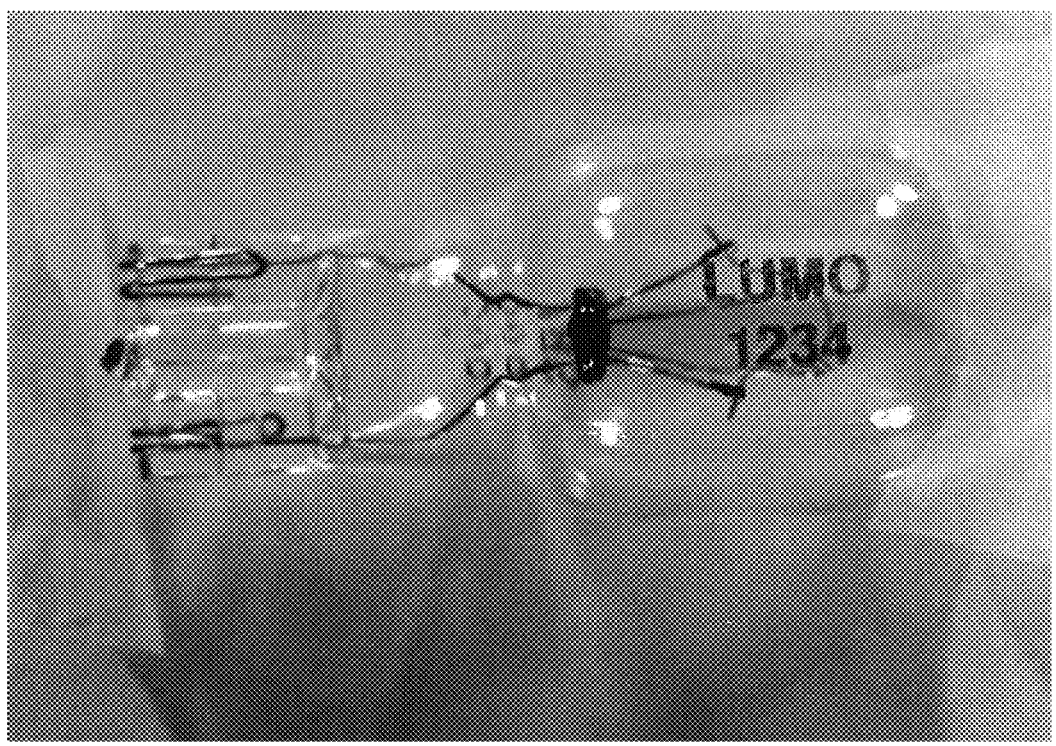

The marking materials and substrate described and illustrated in FIG. 5 above are employed, applying the marking materials electrostatically as dry particles. Application of the same laser beam producers markings which have more even edges, a smoother surface and more uniform thickness.

HYPOTHETICAL EXAMPLE D

The marking materials and substrate described and illustrated in FIG. 5 above are employed, applying the marking materials electrostatically as liquid droplets. Application of the same laser beam producers markings which have more even edges, a smoother surface and more uniform thickness.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF PREFERRED EMBODIMENTS

Below follow some basic definitions as used herein:

Ceramic and porcelain enamel: A soft melting glass similar in all cases and like other ceramic glazes, composed of fluxes and alumino-silicates. Porcelain enamels are typically used on metallic surfaces.

Glass frits: Pre-fused glass material which is produced by fritting (the rapid chilling of the molten glassy material), then ground to a powder. Frits are typically employed as a constituent in a glaze.

Mixed metal oxides: An oxide compound containing more than one metal oxide.

Glass frits generally are composed of alkali metal oxides, alkaline earth metal oxides, silica, boric oxide and transition metal oxides. In specific, additional information is known about the commercial marking materials Cerdec 29-1060 Amber stain, which contains silver sulfide, copper, copper oxide, barium sulfate, iron sulfide, calcium hydroxide and crystalline silica. Also, Cerdec 29-1777 Amber stain is also known to contain silver sulfide, copper oxide, copper-iron sulfide and kaolin clay. Also, Cerdec 29-346 Amber stain is known to contain copper, copper oxide, silver sulfide, barium sulfate, iron sulfate, iron oxide, and crystalline silica. Also, Cerdec 24-2702 black stain is known to contain lead borosilicate frit, C.I. pigment black 27 (containing cobalt compounds, iron oxide chromium compound), C.I. pigment black 30 (containing nickel, manganese and chromium compounds and iron oxide) C.I. pigment blue 72 (containing cobalt compound).

Comparable mixed metal oxide and glass frit materials can be secured through manufacturers such as Bayer Company, Cookson Matthey Zircon, Ferro Corp., Cerdec Corp., E.I. duPont de Nemours & Co., Hoechst Celanese Corp., and Dow Chemical Co.

The method of this invention is especially suitable for marking metals, plastics, glasses, and glass ceramics. Glasses and glass ceramics are well known to the person skilled in the art and described, for example, in Ullmanns Enzyklopädie der technischen Chemie, 4th edition, Vol. 12, pp. 317–366.

By ceramic materials are meant inorganic, non-metallic, high-melting materials that are usually referred to in the literature as clay ceramics and special ceramics. Examples thereof are oxides in crystalline or glassy form, e.g. alkali metal or alkaline earth metal aluminosilicates or aluminoborates, as well as non-oxides such as carbides, nitrides, and silicides. For further examples, attention is drawn to Ullmanns Enzyklopädie der techn. Chemie, 4th Edition, Vol. 13, pp. 712–716.

Glazes are classified chemically as follows:

1. Bases, the conspicuously fluxing agents, represented by alkali metal oxides, the alkaline earth oxides, zinc oxide, lead oxide and many coloring oxides or chromophoers.
2. Intermediates, which includes amphoteric oxides, a group from which alumina is the common example and to which ferric, chromic, manganic, and other oxides are sometimes assigned. Boric acid is sometimes considered a member of this group.
3. Acids, to which silica, phosphoric oxide, zirconia and fluorine belong.

Glazes are glassy coatings applied to a ceramic material and having a composition very similar to that of glass (op. Cit., pp. 722–724). Typical examples of glazes are those containing quartz, clay, alkali metal oxides, alkaline earth metal oxides, and low-melting oxides (such as $Na_2O$, $K_2O$, CaO, BaO, and PbO) as fluxes.

The elements listed on the far left of the Periodic Table (as now drawn up and widely circulated) are all elements that form Bases when their oxides are combined with water, eg, $Na_2O+H_2O=2NaOH$ (lye). So do lime (CaO) and magnesia (MgO). The elements at the right, the non-metals mostly, form Acids when their oxides combine with water, eg, $CO_2+H_2O=H_2CO_3$ (carbonic acid). The elements in between, mostly "transition metals", tend to exhibit "amphoteric" behavior, i.e., they can go either way, depending what else is close by.

A molten glass is chiefly a network made up of silicon oxide molecules linked together in chains. But at very high temperature, the silica molecules are free to roam around, and in a sense behave as a solvent of other molecules. Alumina ($Al_2O_3$) dissolves in this solvent and the combination is "acidic"; if the molten glaze contains lesser amounts of basic molecules (the oxides of the alkali metals and the alkaline earth elements in particular), the glaze will be classifiable as an acidic glaze, and copper oxide will impart a green colour to the glaze on cooling (oxidation conditions only). If, however, there are sufficient molecules of the basic elements in the mix, the glaze will be said to be basic and in it copper oxide will exhibit a blue colour (e.g., soda blue of raku).

Depending on the utility, the materials to be marked may be colorless, white, black or colored with a suitable pigment on which the resulting marking layer additionally provides contrast or which contains a pigment (e.g. metal, glass, ceramic or organic colorant).

In the practice of this invention, the laser or diode utilized must provide a relatively low energy level ranging from 1 to 20 watts at the workpiece surface to be marked. Commercially available and conventionally powered laser marking systems operating in either continuous wave or pulsed mode can be used. For example, a pulsed, Nd:YAG laser with a maximum capacity of 100 watts and pulse durations of 5 to 200 microseconds at a frequency of 20 kHz or higher could be used. However, use of this type of laser would require reducing the effect of the radiant energy using mechanical apertures and/or neutral density filters and/or polarizers and/or de-focusing the beam at the surface of the workpiece as shown in FIG. 9.

The workpiece illustrated in FIG. 6 was created using a Lumonics Lightwriter™ lamp pumped Nd:YAG laser marker configured with a 2 mm mechanical aperture and a polarizer which produced a CW beam focused by a 100 mm by 100 mm flat field lens to a spot size of approximately 125 microns with measured power of 5 watts and which was moved by a beam steering mechanism at a speed of 200 mm/second.

Additionally, a Uniphase Stablite™ diode pumped Nd:YAG laser has been used which produced a 700 micron diameter CW beam focused using a 50 mm lens to a spot size of 90 microns with measured power of 3.1 watts and moved manually at a speed of approximately 50 mm/second.

Figure 9:
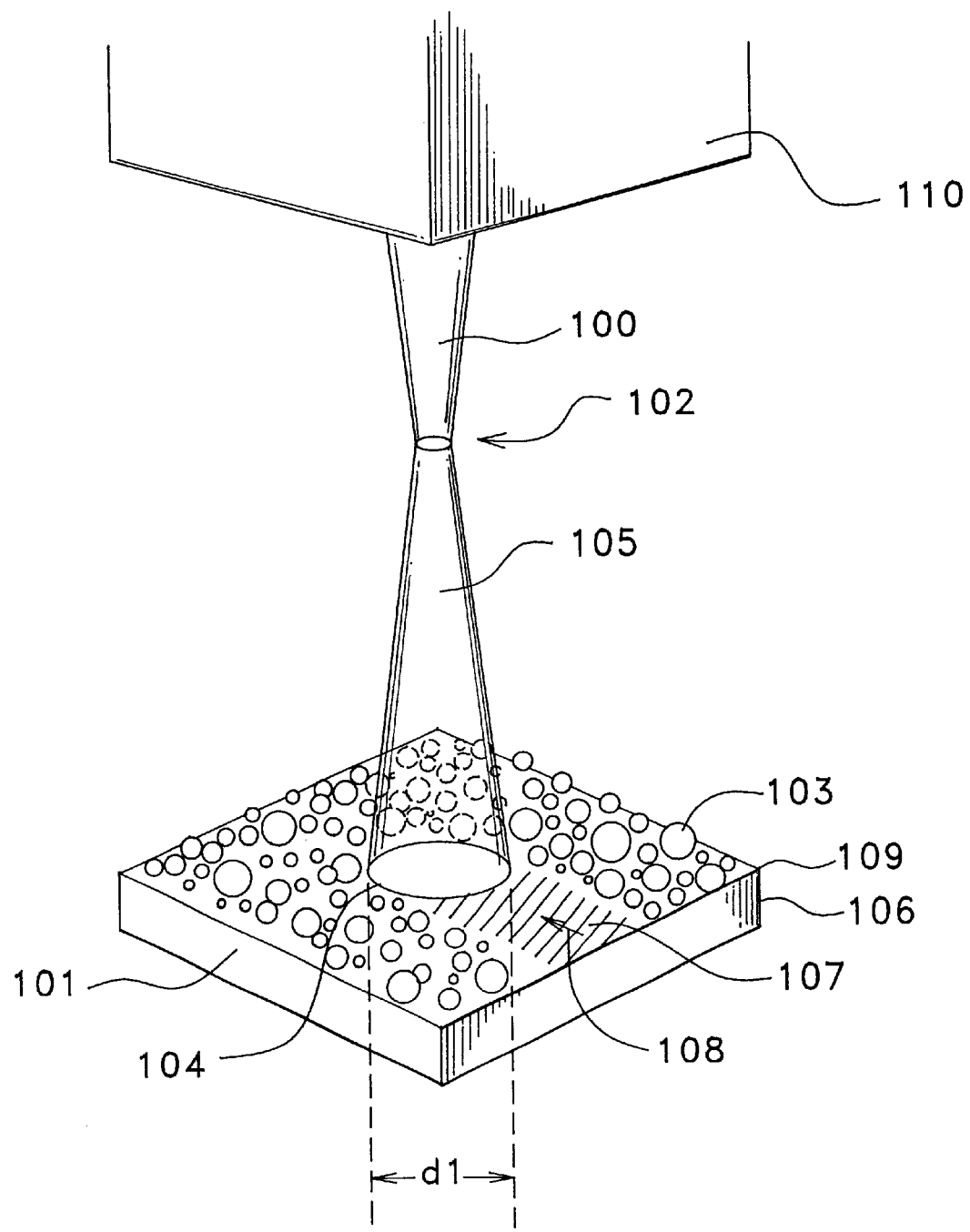
FIG. 9 is a drawing of the inventive process in action.
Figure 10:
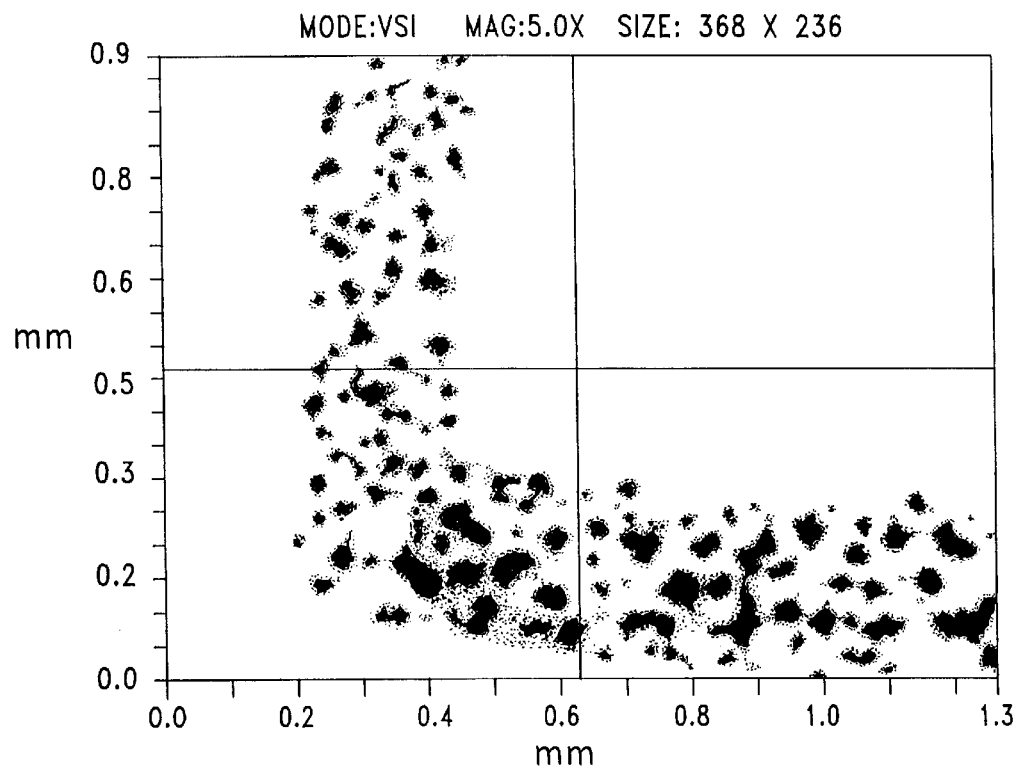
Figure 10:
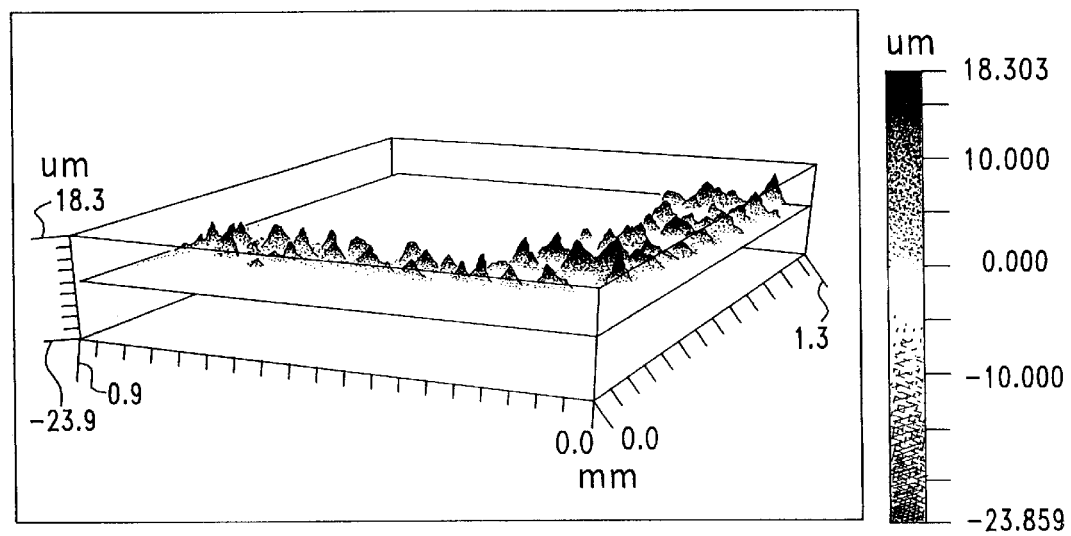
Figure 10C:
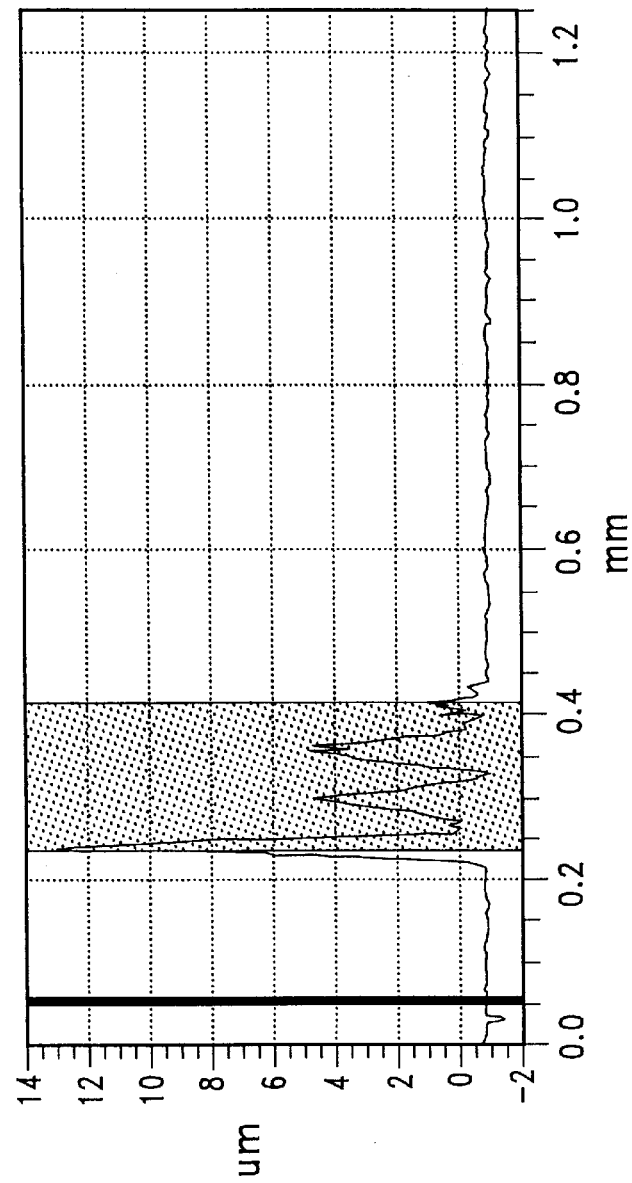
Figure 10D:
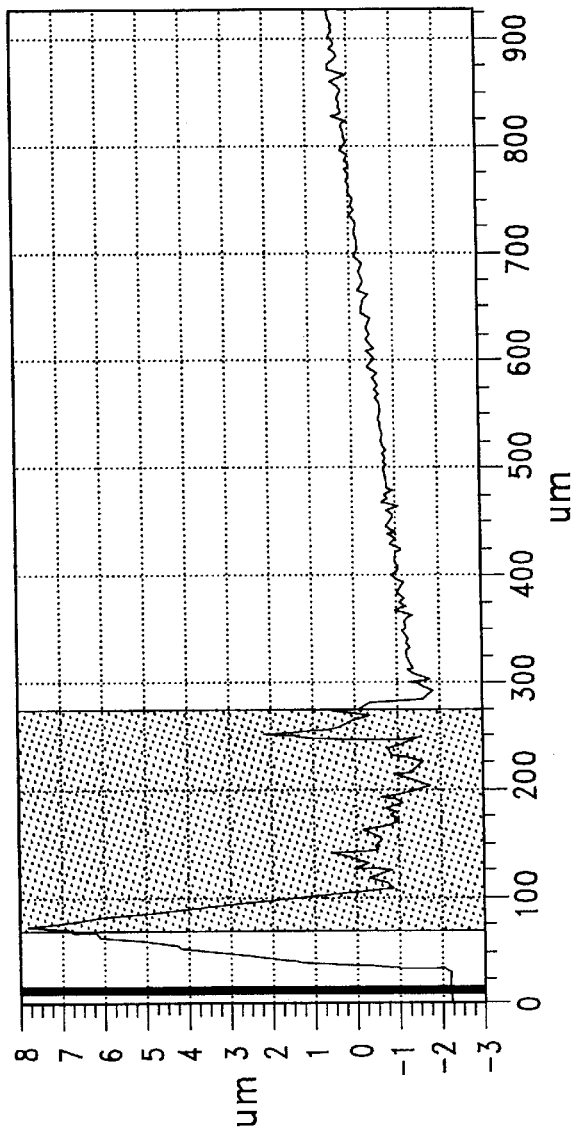

In FIG. 9, the conventionally powered laser beam 100, 105 is de-focused at the surface 109 of the workpiece 106 by allowing the laser beam 100 to pass through the focal plane 102 and impinge upon the marking material 103 applied to the surface 109 of the workpiece 106. It has been shown that placing the workpiece as shown below the focal plane using the diverging radiant energy 105 is preferred over the use of the converging radiant energy 100 above the focal plane 102. The resulting spot 104 has a diameter d1 in the preferred mode of 5 to 200 microns. The direction of movement 108 of the diverging laser beam 105 on the surface of the marking material 103 is shown. A beam steering mechanism 110 moves the beam. The resulting bonded layer comprising the mark 107 is shown in contrast to the remaining non-irradiated marking material 103 on the surface 109 of the workpiece 106.

In a preferred embodiment of this invention, a less expensive, less powerful air-cooled laser which consumes considerably less electric energy, such as a direct diode or diode pumped laser is used. Optimal results are generally obtained using 5 watts of average power with a spot size of 125 microns moving at a speed of 200 mm/sec across the surface of the marking material.

Lasers whose parameters can be readily adjusted, for example, pulse content and pulse duration, permit the best possible adaptation to the requirements of the marking material 103 and the composition of workpiece 106 to be marked. In no case is a preheating of the workpiece 106 necessary. The proper radiant energy is that at which the marking material absorbs energy most efficiently. It is a major advantage of the present invention that only a single pass of the irradiating beam is required to practice the invention. In all experiments the inventive process was practiced at a room temperature of approximately 70° F. Furthermore, it is believed that both hot and cold substrate materials can be marked during their production using the inventive process.

In an alternate embodiment of the invention, the workpiece may be moved under a stationary laser beam at similar relative speeds to produce the desired mark.

Preferably, the relative speeds taught herein are executed by the use of a computer controlled workpiece movement mechanism (not shown) for example, an X-Y and/or rotary stage using stepper and/or servo motors as supplied by Newport Corporation and/or a beam steering mechanism (not shown) for example the HPM™ Scan Head using galvo-mirrors as supplied by General Scanning, Inc. Alternately, beam steering can be effected, for example, acousto-optically, holographically, or by polygon scanners.

Some suitable combinations of marking materials and workpiece composition are listed below:

TABLE I

| | Marking Materials | Substrate Materials |
| --- | --- | --- |
| 1. | Glass frit with energy absorbing enhancers and certain colorants and/or pigments including porcelain enamels | Glass, ceramic, porcelain and certain metals including aluminum, brass steel and stainless steel |
| 2. | Mixed metal oxides with energy absorbing enhancers and certain colorants and/or pigments | Metals including aluminum brass copper, nickel, tin steel, stainless steel, and certain glasses, ceramics and plastics |
| 3. | Mixed organic pigments with energy absorbing enhancers | Commercial plastics including ABS, PVC, Nylon ™, Delrin ™ Teflon ™ and Plexiglas ™ |

Use of and/or the combination of different compositions of marking material, second and/or subsequent applications of marking material and/or the adjustment of laser parameters will result in variations in the durability, appearance, and structural form of the resulting mark. Thus, a person skilled in the art of laser marking can create a wide variety of marking characteristics to suit his requirements. All of these marking characteristics can be achieved with the use of a single low-power, low-cost air-cooled diode laser. Furthermore, an infinite variety of colors can be achieved. These features are a significant advance in the art of surface marking.

Preparation of the marking materials, in liquid form, can, for example, occur through low shear mechanical mixing, high shear mechanical mixing, ultrasonic mixing and/or milling. The marking material, in liquid form, can be manually or automatically applied to the substrate surface at the desired thickness by hand-spraying it onto the substrate surface using automated electrostatic spray equipment. Excess material not bonded to the substrate surface can be removed by conventional cleaning processes. In high-volume applications, the unused marking material can be recovered from the cleaning process and reused.

Electrostatic application of marking materials in liquid and/or aerosol form can be carried out using suitable electrostatic methods known in the art, according to the types of substrates to be marked, as discussed above. Different techniques will be appropriate for applying marking materials to conductive, dielectric or semiconductor materials.

The present invention relates to a method for coating objects by electrostatic powder-coating, according to which the dry powder particles or liquid droplets are mixed with a transporting gas and converted into a fan-shaped spray before reaching the object to be coated. In the technique of electrostatic coating, as was emphasized in the U.S. Pat. No. 3,263,127 (which is incorporated herein by reference), a fan-spray is of particular interest since the dry powder particles or liquid droplets, thanks to the fan shape, may be more easily charged by ion bombardment. Since the duct carrying the "transporting gas" mixture to the gun is cylindrical and of small diameter (in general, 7 to 10 millimeters), it is not easy to change such a cylindrical stream into a homogeneous fan-spray several centimeters wide. Shaping the stream by simply transforming the shape of the duct, as shown in U.S. Pat. No. 3,263,127, is not entirely satisfactory, as the spray obtained is bound to lack homogeneity on account of the high degree of mechanical inertia of the dry powder particles or liquid droplets, the majority of which tend to come out through the center of the outlet slit, while very few emerge at its edges. Moreover, if such a nozzle is placed with the fan-spray in a vertical position, experience shows that due to the effect of gravity most of the powder particles come out toward the bottom of the slit.

To overcome these drawbacks, there has already been suggested, as described in U.S. Pat. No. 3,870,232 (which is incorporated herein by reference), a nozzle equipped with separate outlet tubes, the dry powder particles or liquid droplets being sucked into each of them by means of auxiliary air being injected through holes of a given diameter, which produces perfect homogeneity of the total spray, whatever the angle of the nozzle. Such a nozzle functions with a strong air flow, which is advantageous in certain cases, for example when it is wished to coat at a distance, but which is often not desired, since a powerful air flow may prevent the marking material from being deposited on certain shapes of objects, due to a blowing effect. Finally, it is well known that greater electrostatic efficiency is obtained when the dry powder particles or liquid droplets are slowed down as they leave the nozzle, thus enabling them to follow the lines of force of the electric field more easily; a strong axial air flow, however, increases the axial speed of the stream.

The process, as described in U.S. Pat. No. 4,110,486 (which is incorporated herein by reference), makes it possible to overcome the drawbacks of the previous systems, and so to produce an electrostatic spraying nozzle which provides at its outlet a fan-spray of dry powder particles or liquid droplets, the contents of said spray being homogeneous whatever its angle may be, and its speed being slow compared with the speed of the incident "transporting gas" mixture. It will be appreciated that the marking material is uniformly suspended in the "transporting gas" when it leaves the extraction device. If the speed of the stream of "transporting gas" is high, that is to say greater than about 15 meters/second, and there are no substantial bends in the passage leading from the extraction device to the nozzle, the marking material will remain homogeneously distributed throughout the "transporting gas" stream resulting in a uniform application of the marking material onto the substrate surface.

Electrostatic Marking Materials

Dry nonconductive powder passes from a hopper by means of a vibrating plate through an adjustable, nonclogging extraction device and is directed by means of a stream of "transporting gas" issuing through a rectangular orifice from a variable volume plenum chamber into a venturi. The marking material passes into the venturi and from the venturi through a discharge nozzle and from the discharge nozzle onto the substrate to be coated. Corona wires are located in the proximity of the issuing end of the discharge nozzle so as to charge the dry powder particles or liquid droplets in order to direct them onto the substrate.

A composition for electrostatic deposition of dry porcelain enamel frit wherein the frit is reacted with a flow improving additive containing of an alkoxysilane, and preferably combined with an adhesion promoting composition consisting of a silazane is disclosed in U.S. Pat. No. 3,930,062. Additional benefits are also derived if the sprayed composition also includes a chlorosilane.

In support of this disclosure, the following U.S. Patents are incorporated herein by reference in their entirety:

U.S. Pat. No. 5,698,269 (Electrostatic Deposition of Charged Coating Particles onto a Dielectric Substrate)

U.S. Pat. No. 5,830,274 (Electrostatic Deposition of Charged Coating Particles onto a dielectric Substrate)

U.S. Pat. No. 4,099,486 (Electrostatically Coating Hollow Glass Articles)

U.S. Pat. No. 3,930,062 (Composition and Method for Electrostatic Deposition of "Dry Porcelain enamel Frit)

U.S. Pat . No. 3,558,052 (Method and Apparatus for Spraying Electrostatic Dry Powder)

U.S. Pat. No. 4,110,486 (Electrostatic Powder Coating Method)

U.S. Pat. No. 6,063,194 (Dry Powder Deposition Apparatus)

U.S. Pat. No. 6,202,945 (Method and apparatus for electrostatic powder coating)

U.S. Pat. No. 5,925,419 (Electrostatic powder coating method for road wheels)

U.S. Pat. No. 5,915,621 (Electrostatic powder coating method and apparatus)

U.S. Pat. No. 5,811,158 (Method and apparatus for electrostatic powder coating)

U.S. Pat. No. 5,776,554 (Electrostatic powder coating system and method)

U.S. Pat. No. 5,747,150 (Electrostatic powder coating method)

U.S. Pat. No. 5,711,489 (Electrostatic powder coating method and apparatus)

U.S. Pat. No. 5,695,826 (Electrostatic powder coating apparatus and method)

A laminar air flow across the surface of the workpiece is created by venting and/or exhausting equipment insuring a consistent localized environment in which the inventive process can occur.

Marking Materials

Generally, the marking materials useful in the invention comprise a wide variety of components which can be used alone or in combination to absorb radiant energy, create heat and form (through fusing, sintering or the like) a permanent marking upon a substrate. As discussed elsewhere in this application, the nature of the substrate, the radiant energy source and the components to be used in the marking material must be selected with regard to how they will function together. The finished markings may be visible and/or colored, but may also be invisible under normal light, but visible in other parts of the spectrum such as the IR or UV ranges, and can also be fluorescent and/or luminous.

The marking materials may be specifically described as those materials which, upon application of sufficient laser or diode based energy to produce the necessary heat, bond to glass or ceramic or other substrates to provide an enhanced contrast and/or color marking on the substrate. Low temperature glass frits and the like can be used alone or in combination with other materials.

A wide variety of metal compounds can be used as components of the marking material, generally selected from the oxides, mixed oxides, sulfides, sulfates, carbonates, carbides, nitrides, silicides, and hydroxides of the alkali metals, alkaline earth metals and transition metals. Such compounds can be used to perform at least one function such as absorbing the radiant energy, fusing and/or sintering to form a bond with the substrate.

Representative metals and metal compounds which are expected to be useful include copper, copper oxides, silver sulfide, iron oxides, iron sulfide, iron sulfate, barium sulfate, calcium hydroxide, copper-iron sulfides, silica, various cobalt compounds and iron-chromium oxides.

Examples of suitable inorganic pigments which might be used are described in Ullmanns Enzyklopädoe der techn. Chemie, 4th Edition, Vol. 14, pp. 1–12, and in the publication of the Dry Color Manufacturers' Association (DCMA) "Classification and Description of the Mixed Metal Oxide Inorganic Colored Pigments", Second Edition, January, 1982. These pigments are "ceramic colorants:", for example, compounds of oxides of different transition elements or compounds of oxides of transition elements and of metal oxides of elements of the main groups of the Periodic System, e.g., having the spinel-type structure, and also compounds such as zirconium silicate, zirconium oxide or tin oxide, the crystal lattice of which contains ions of transition metals or rare earth metals, as e.g., in zirconium vanadium blue, in zirconium preseodyme yellow and in zirconium iron pink, or the cadmium sulfides and cadmium sulfoselenides as well as inclusion pigments containing such compounds, e.g., based on zirconium silicate, tin oxide, zirconium oxide or quartz.

Examples of typical ceramic colorants are cobalt aluminates, chrome tin pink sphere, chrome tin orchid cassitorite, tin vanadium yellow, zirconium praseodyme yellow, zirconium iron pink, the cadmium sulfoselenides and cadmium sulfides and the inclusion compounds containing them, e.g., zirconium silicate, tin oxide, zirconium oxide or quartz; copper-red, manganese pink, colcothar, the iron oxide brown pigments such as iron oxides, iron-chrome-alumina spinels, manganese-alumina spinels, wine-chrome spinels, iron-alumina spinels, zinc-iron spinels, nickel-iron spinels, manganese-chrome spinels, zinc-iron-chrome spinels, tin oxide, titanium dioxide and titanates, e.g., nickel-antimony titanate, chrome-antimony titanate or manganese-antimony titanate.

Preferred pigments are zirconium vanadium yellow, praseodyme yellow, the iron oxide brown pigments such as zinc-iron-chrome spinels and zirconium iron pink, titanium dioxide, titanates, cadmium sulfides and cadmium sulfoselenides as well as inclusion pigments containing such compounds.

Organic Pigments Useful in Marking Materials

Organic pigments are intensely colored, particulate organic solids that are essentially insoluble in, and physically and chemically unaffected by the vehicle or substrate into which they are incorporated.

Characteristics of Organic Pigments
    Bright, pure, rich colors
    More expensive than inorganic pigments
    Less resistant to sunlight, humidity, and chemicals
    Key raw materials are petroleum based Color is produced in compounds by selective absorption and reflectance of specific wavelengths of the visible spectrum. Selective effect arise from the presence of vibrating (resonating) electrons in the structure of a molecule or molecular group. If a molecule absorbs in the visible range, it possesses a color complementary to that which is absorbed. Thus, a compound absorbing in the violet is seen as yellow. Chemical groups which cause absorption and give rise to color are called chromophores. Groups which intensify or modify color are known as auxochromes.

Some examples of chromophore chemical groups include:

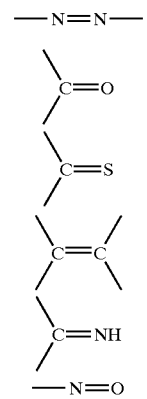

Some examples of auxochrome chemical groups include:

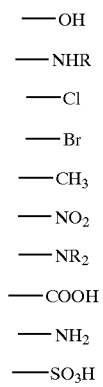

Organic pigments are divided into six categories:
1. Monoazo pigments
2. Diazo pigments
3. Acid and base dye pigments
4. Phthalocyanine pigments
5. Quinacridone pigments
6. Other polycyclic pigments Some azo pigments include:

Pigment Red 3

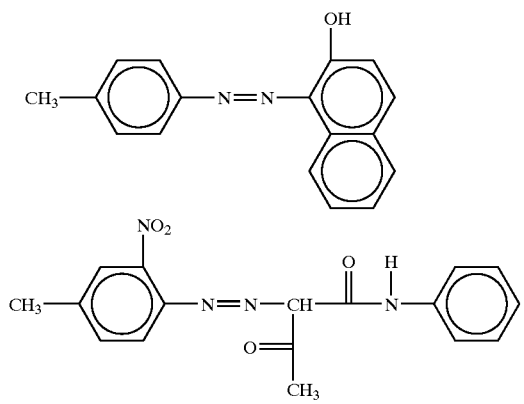

Monoazo Yellow

Pigment Yellow 12 ($C_{32}H_{26}Cl_2N_6O_4$) is a yellow diazo pigment. C.I. No. 21090. See diazotization. Preparation: Condensation of 3,3'-dichlorobenzidine di-diazotate with acetoacetanilide. Uses: Printing inks; lacquers resistant to heat and solvents; in rubber and resins; in paper coloring, textile printing.

Phthalocyanine Blue

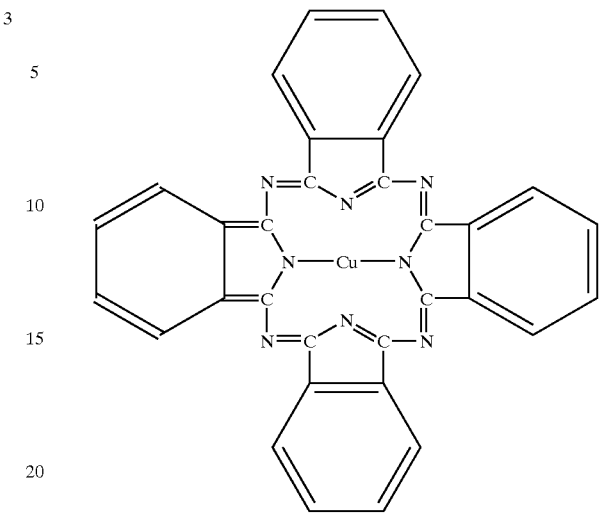

Pigment Blue 15 ($C_{32}H_{16}N_8Cu$) is a bright blue copper phthalocyanine pigment (q.v.). C.I. No. 74160. Preparation: By heating phthalonitrile with cuprous chloride. Uses: In paints; alkyd resin enamels; printing inks; lacquers; rubber; resins; papers; tinplate printing; colored chalks and pencils.

Pyrazolone

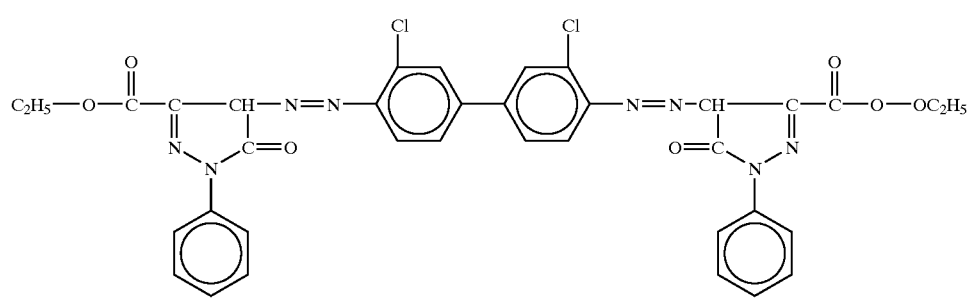

Benzimidazolone Pigments:

Hansa Yellow

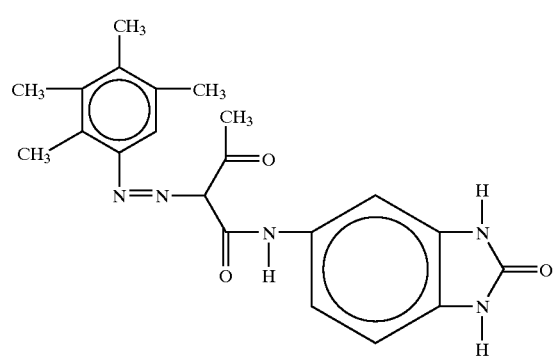

Phthalocyanine Pigments are the single most successful class of organic pigments, and include:

Phthalocyanine Green

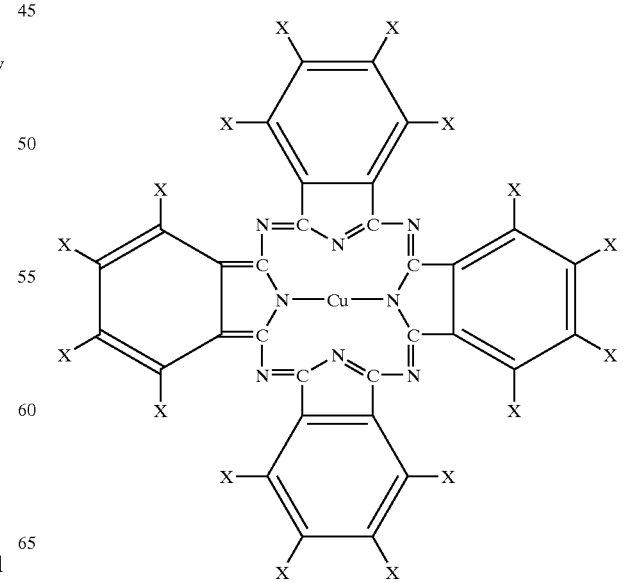

(X = H, Cl or Br, empirical formula $C_{32}H_xN_8Cl_yBr_zCu$  x + y + z = 16)

Pigment Green 7 ($C_{32}O_{0-1}N_8cl_{15-16}Cu$) is a bright green chlorinated copper phthalocyanine pigment (q.v.). C.I. No. 74260. Derivation: Heating copper phthalocyanine in sulfur dichloride under pressure. Uses: Paints; printing inks; lacquers; leather and book cloth; paper surfacing; chalks; colored pencils.

Major reasons for use:

Excellent stability to solvents, heat, light, and weathering

High tinctorial strength

Cost effectiveness

Consistency and uniqueness of shades

Completely non-toxic

Pigment Blue 24 ($C_{37}H_{34}N_2O_9S_3Na_2$) is a bright greenish blue triarylmethane pigment (q.v.). C.I. No. 42090. Uses: In printing inks, especially for tinplate printing; in rubber; plastics; artist colors; lacquers.

Pigment Blue 19 ($C_{32}H_{28}N_3O_4SNa$) is a bright blue to bright reddish navy triphenylmethane pigment (q.v.). C.I. No. 42750A. Use: Coloring for candles.

Carbon black, although sometimes classified as inorganic and not considered to have "positive color value", is considered an organic pigment for the purposes of the invention, also functioning as an energy absorbing enhancer.

Radiant Energy Sources

Examples of laser or diode-based energy sources to be used are solid state pulsed and/or CW lasers such as ruby lasers or frequency multiplied Nd:YAG lasers, pulsed lasers with booster such as pulsed dye lasers or Raman shifter, and also continuous-wave lasers with pulse modifications (Q-switch, mode locker), for example, on the basis of CW Nd:YAG lasers with frequency multiplier or CW ion lasers (Ar, KR), as well as pulsed metal vapor lasers; for example, copper vapor lasers or gold vapor lasers, or high-capacity pulsed or continuous wave semi-conductor diode lasers, and also pulsed gas lasers such as CO2 and excimer lasers.

What is generally preferred is a low-power (i.e., about six watts or less), low-cost continuous-wave diode laser. Any of the other higher power lasers need to have the power partially attenuated by known means including mechanical apertures and/or neutral-density filters and/or polarizers and/or low-efficiency mirrors.

The wavelength to be selected for the laser or diode based energy source is that at which the marking material, with or without the energy absorbing enhancer absorbs the radiation most efficiently.

Several different methods are suitable for laser marking, for example: a) the mask method whereby the area to be marked is uniformly coated with the marking material and the radiant energy passes through a fixed, data specific mask and impinges onto the marking material to produce the desired mark; and b) the dot-matrix method whereby the area to be marked is uniformly coated with the marking material and the radiant energy passes through a computer controlled, changeable data, dot-matrix mask and impinges onto the marking material to produce the desired mark; and c) the beam deflection method whereby the area to be marked is uniformly coated with the marking material and the radiant energy passes through a beam steering head and impinges onto the marking material to produce the desired mark; and d) the X-Y plotter method whereby the area to be marked is uniformly coated with the marking material and the radiant energy moves on a gantry type X-Y mechanism utilizing mirrors and/or fiber-optics and impinges onto the marking material to produce the desired mark; and e) the part moving method whereby the area to be marked is uniformly coated with the marking material and the workpiece to be marked is moved using an X-Y motor driven stage under a stationary beam which impinges onto the marking material to produce the desired mark; and f) the area irradiation method whereby data specific marking material is uniformly applied to the surface of the workpiece and the data specific marking area is irradiated by means of a beam steering mechanism or by means of moving the workpiece under a stationary beam. In methods b), c), d), e) and f) the laser is preferably combined with a laser marking system so that the marking material can be irradiated with any, e.g., computer programmed, digits, letters and special symbols where the laser beam strikes the marking material in the most efficient manner possible.

In one important aspect of the invention, the marking materials can be formulated to absorb a narrow band of wavelengths, e.g., approximately 1 micron, and will react with the substrate material when the proper temperature is achieved. In this way, a single radiant energy source (laser or diode) can be employed to mark all materials.

Suitable substrate materials which can be marked include conductive materials, such as:

metals, ferrous and non-ferrous, which can be pure elemental metals, alloys, and include coatings or plating layers having similar properties; and conductive polymer compositions, which can be intrinsically conductive due to physico-chemical properties or filled with conductive fillers, fibers and the like.

A variety of nonconductive or dielectric materials are also suitable for marking, but will normally require coating with a conductive material before the marking material(s) are applied by electrostatic methods. For example, all types of glasses, whether conventional or specialized as with optical glasses, glasses incorporating nuclear waste for storage and others, may be employed. Similarly, ceramics of all types, including those based upon alkali metal and alkaline earth metal carbonates and the like or ceramic compounds combining at least two of the elements carbon, silicon and nitrogen without oxygen can be used. Various baked porcelain compositions can also be employed. Semiconductors, which are neither clearly conductive nor completely dielectric, can also be employed, but may require conductive coatings before electrostatic application of marking materials.

A wide variety of commercial polymeric materials or plastics can be employed as substrates in the present invention. A plastic is made up principally of a binder together with plasticizers, fillers, pigments, and other additives. The binder gives a plastic its main characteristics and usually its name. Thus, polyvinyl chloride is both the name of a binder and the name of a plastic into which it is made. Binders may be natural materials, e.g., cellulose derivatives, casein, or milk protein, but are more commonly synthetic resins. In either case, the binder materials consist of very long chain-like molecules called polymers. Cellulose derivatives are made from cellulose, a naturally occurring polymer; casein is also a naturally occurring polymer. Synthetic resins are polymerized, or built up, from small simple molecules called monomers. Plasticizers are added to a binder to increase flexibility and toughness. Fillers are added to improve particular properties, e.g., hardness or resistance to shock. Pigments are used to impart various colors. Virtually any desired color or shape and many combinations of the properties of hardness, durability, elasticity, and resistance to heat, cold, and acid can be obtained in a plastic.

There are two basic types of plastics: thermosetting, which cannot be resoftened after being subjected to heat and pressure; and thermoplastic, which can be repeatedly softened and remolded by heat and pressure. When heat and pressure are applied to a thermoplastic binder, the chainlike polymers slide past each other, giving the material plasticity. However, when heat and pressure are initially applied to a thermosetting binder, the molecular chains become cross-linked, thus preventing any slippage if heat and pressure are reapplied.

Some typical plastics are: epoxy resins; polyacrylics; polycarbonates; polyethylenes; polyolefins; polypropylenes; polystyrenes; polyurethanes; polyvinyl chlorides; vinyl plastics. Most of these materials will be dielectrics, unless they are synthesized or filled to create conductive materials. Such polymers can be thermoplastic or thermosetting, and can be solid or slightly pliable under ambient conditions. Exemplary families of polymers include the polyethylenes, polypropylenes, polybutenes and various forms of synthetic and natural rubbers, polyvinyl chlorides, mylars, nylons, polyarylene sulfides, polystyrenes, polytetrafluoroethylenes (PTFE), polyacrylates of various types, and copolymers of many of the preceding. Due to the generally low level of power used to create the markings, the methods of the invention can be used to mark cast objects of trinitrotoluene (TNT) and similar military and commercial explosives, provided that the objects are first provided with conductive coatings and the marking materials electrostatically applied. An advantage of the present invention is that it provides permanent marking upon "slippery" plastics such as nylon and PTFE.

Although the present invention has been described with reference to preferred embodiments, numerous modifications and variations can be made and still the result will come within the scope of the invention. No limitations with respect to the specific embodiments disclosed herein are intended or should be inferred.

I claim:

1. A thermally activated, chemically based marking method comprising the steps of:
    electrostatically applying a layer of an energy absorbing marking material to a conductive or dielectric substrate to be marked; and
    irradiating said layer with a radiant energy beam having less than 20 watts of average power and a wavelength selected to excite said energy absorbing material in accordance with the form of a marking to be applied, thereby forming a marking layer atop said substrate, whereby baking is not required to form the marking layer.

2. The method of claim 1, further comprising a step of providing a laminar air flow across said substrate during the irradiating step.

3. The method of claim 1, wherein said marking material comprises at least one metal compound.

4. The method of claim 1, wherein said marking material is applied by direct electrostatic coating of a conductive substrate.

5. The method of claim 1, wherein said marking material is applied by direct electrostatic coating of a dielectric substrate, after said substrate has been coated with a layer of conductive material.

6. The method of claim 1, wherein said marking material is applied as dry particles.

7. The method of claim 1, wherein said marking material is applied as liquid droplets.

8. The method of claim 1, wherein said marking material is electrostatically applied in the form of a marking to be applied to said substrate.

9. The method of claim 1 wherein said radiant energy beam is produced by a laser, diode laser or diode-pumped laser.

10. The method of claim 1, wherein said marking material comprises an energy absorbing enhancer.

11. The method of claim 10 wherein said energy absorbing enhancer comprises carbon black.

12. The method of claim 1, wherein said marking material comprises at least one colorant.

13. The method of claim 1, wherein said substrate comprises materials selected from the group consisting of metals, glasses, ceramics and plastics.

14. The method of claim 13, wherein said substrate comprises at least one metal.

15. The method of claim 13, wherein said substrate comprises at least one glass.

16. The method of claim 1, wherein said marking material comprises at least one glass frit material.

17. The method of claim 16, wherein said glass frit material comprises at least one oxide selected from oxides of alkali metals, alkaline earth metals, silicon, boron and transition metals.

18. The method of claim 1, wherein said marking material comprises at least one glass frit material and at least one metal compound.

19. A thermally activated chemically based marking method comprising the steps of:
    electrostatically applying a layer of glass frit material containing an energy absorbing enhancer to a glass substrate; and
    irradiating said layer with a radiant energy beam having a wavelength selected to excite the energy absorbing enhancer in accordance with the form of a marking to be applied, thereby forming a bonded and permanent marking layer atop the substrate which is visible in contrast with the substrate; and
    wherein the layer of glass frit material has a thickness ranging between 5 and 500 microns.

20. The method of claim 19, further comprising the step of providing a laminar air flow across the substrate during the irradiating step.

21. The method of claim 19, wherein said glass frit material is applied as dry particles.

22. The method of claim 19, wherein said glass frit material is applied as liquid droplets.

23. The method of claim 19, wherein the glass frit material further comprises a borosilicate glass and the energy absorbing enhancer comprises carbon black.

24. The method of claim 19, wherein the radiant energy beam comprises a laser beam having an energy level ranging between 1 and 30 watts, a spot size ranging between 5 and 200 microns, and a marking speed along the substrate ranging between 25 and 1000 mm/sec.

25. The method of claim 19, wherein said irradiating step is started at a room temperature of about 70 F.

26. The method of claim 19, wherein the glass frit material further comprises a colorant.

27. The method of claim 26, wherein said colorant comprises at least one organic pigment.

28. A glass material as marked by the process according to claim 19.

29. A thermally activated, chemically based marking method comprising the steps of:
    electrostatically applying a layer of glass frit material containing an energy absorbing enhancer to a metal substrate; and
    irradiating said layer with a radiant energy beam having a wavelength selected to excite the energy absorbing enhancer in accordance with the form of a marking to be applied, thereby forming a bonded and permanent marking layer atop the substrate which is visible in contrast with the substrate; and wherein the layer of glass frit material has a thickness ranging between 5 and 500 microns.

30. The method of claim 29 further comprising the step of providing a laminar air flow across the substrate during the irradiating step.

31. The method of claim 29, wherein the glass frit material comprises a borosilicate glass, and the energy absorbing enhancer comprises carbon black.

32. The method of claim 29, wherein the radiant energy beam comprises a laser having an energy level between 1 and 30 watts, a spot size ranging between 5 and 200 microns, and a marking speed along the substrate ranging between 25 and 1000 mm/sec.

33. The method of claim 29 wherein said irradiating step is started at a room temperature of about 70° F.

34. The method of claim 29, wherein said grass frit material is applied as dry particles.

35. The method of claim 29, wherein said glass frit material is applied as liquid droplets.

36. The method of claim 29, wherein the glass frit material further comprises a colorant.

37. A metal substrate as marked by the process according to claim 29.

38. A thermally activated chemically based marking method comprising the steps of:

electrostatically applying a layer of glass frit material containing an energy absorbing enhancer to a substrate selected from the group consisting of glass, ceramic, porcelain, aluminum, brass, steel, stainless steel and tin; and irradiating said layer with a beam having less than 20 watts of average power and a wavelength selected to excite the energy absorbing enhancer in accordance with the form of a marking to be applied, thereby forming a bonded and permanent marking layer atop the substrate which is visible in contrast with the substrate.

39. A thermally activated chemically based marking method comprising the steps of:

electrostatically applying a layer of glass frit material optionally containing an energy absorbing enhancer to a substrate to be marked in the form of a marking to be applied; and irradiating said layer with a radiant energy beam having less than 20 watts of average power and a wavelength selected to excite the glass frit material and/or said energy absorbing enhancer, thereby forming a bonded and permanent marking layer atop the substrate which is visible in contrast with the substrate.

* * * * *